(12) United States Patent
Gettings et al.

(10) Patent No.: US 9,246,573 B1
(45) Date of Patent: Jan. 26, 2016

(54) REPEATER DEVICES AND METHODS OF USE

(71) Applicant: RoboteX Inc., Sunnyvale, CA (US)

(72) Inventors: Adam M. Gettings, Red Wing, MN (US); Taylor J. Penn, Mountain View, CA (US); Yi Zheng, Palo Alto, CA (US); Andrew G. Stevens, Palo Alto, CA (US); Gabriella L. Seal, Pasadena, CA (US)

(73) Assignee: RoboteX Inc., Sunnyvale, CA (US)

( * ) Notice: Subject to any disclaimer, the term of this patent is extended or adjusted under 35 U.S.C. 154(b) by 0 days.

(21) Appl. No.: 14/447,372

(22) Filed: Jul. 30, 2014

Related U.S. Application Data

(60) Provisional application No. 61/860,242, filed on Jul. 30, 2013.

(51) Int. Cl.
*H04B 7/185* (2006.01)
*H04B 7/155* (2006.01)

(52) U.S. Cl.
CPC ..................................... *H04B 7/155* (2013.01)

(58) Field of Classification Search
CPC ............ B60R 25/104; B60R 2325/205; B60R 2325/304; B60R 25/018; B60R 25/04; B60R 25/102; B65G 63/004; B65G 2201/0252; B65G 59/026; B65G 67/00; B65G 67/02; B65D 88/121; B65D 1/0223; B65D 2590/005

USPC .......................................... 455/11.1, 522, 13.4
See application file for complete search history.

(56) References Cited

U.S. PATENT DOCUMENTS

| | | | |
|---|---|---|---|
| 6,292,134 B1 | 9/2001 | Bondyopadhyay | |
| 6,642,906 B1 | 11/2003 | Machalek | |
| 6,762,719 B2 | 7/2004 | Subotic et al. | |
| 7,030,929 B2 | 4/2006 | Chang et al. | |
| 7,926,598 B2 | 4/2011 | Rudakevych | |
| 8,100,205 B2 | 1/2012 | Gettings et al. | |
| 8,103,212 B1 * | 1/2012 | Pezeshkian | H04B 7/15514 455/11.1 |
| 2003/0011706 A1 | 1/2003 | Chang et al. | |
| 2006/0281404 A1 * | 12/2006 | Lee | H04B 7/2606 455/11.1 |
| 2009/0247070 A1 * | 10/2009 | Baraz | H04B 7/15557 455/11.1 |
| 2014/0076642 A1 | 3/2014 | Gettings et al. | |

* cited by examiner

*Primary Examiner* — Tu X Nguyen
(74) *Attorney, Agent, or Firm* — Levine Bagade Han LLP

(57) ABSTRACT

To increase the range of a remote controlled robot, one or more repeater devices can be used. A repeater device and method of use are described herein that can extend the range of wireless robots and/or improve the connectivity of wireless robots. A repeater device can include a transceiver, which includes both a receiver and a transmitter, and one or more antennas and can be powered by a power supply. Repeater devices can have orienting shapes and/or orienting bases and can be deployed using a repeater device dispenser.

17 Claims, 18 Drawing Sheets

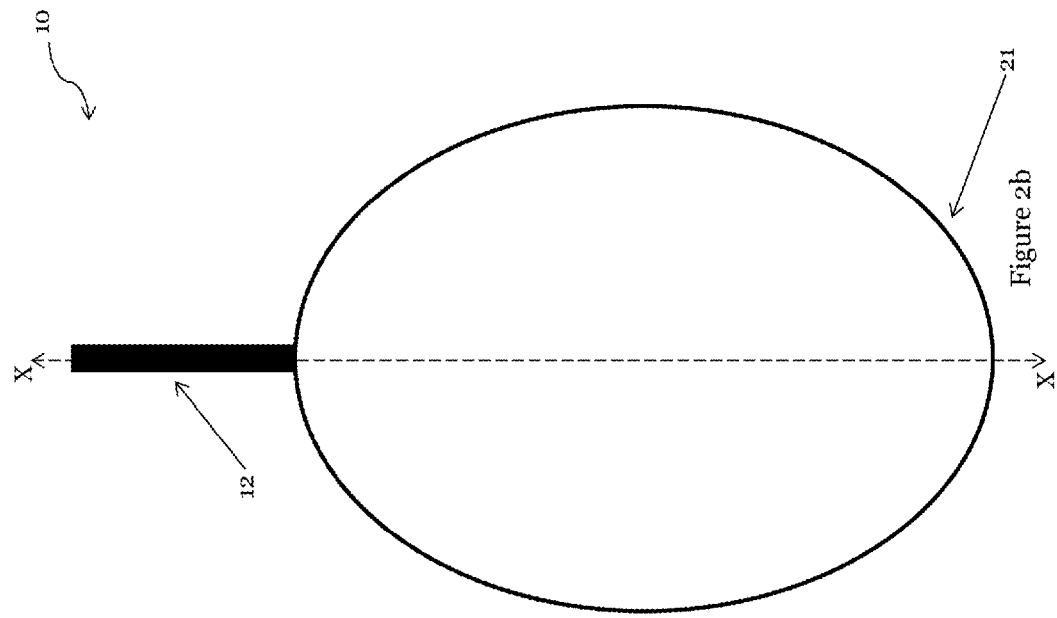
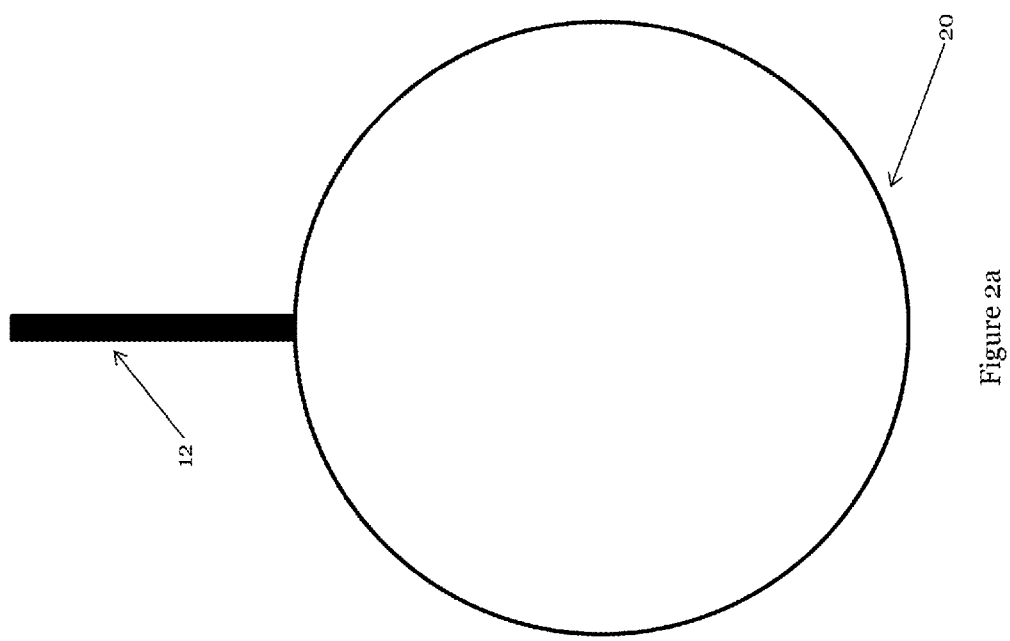

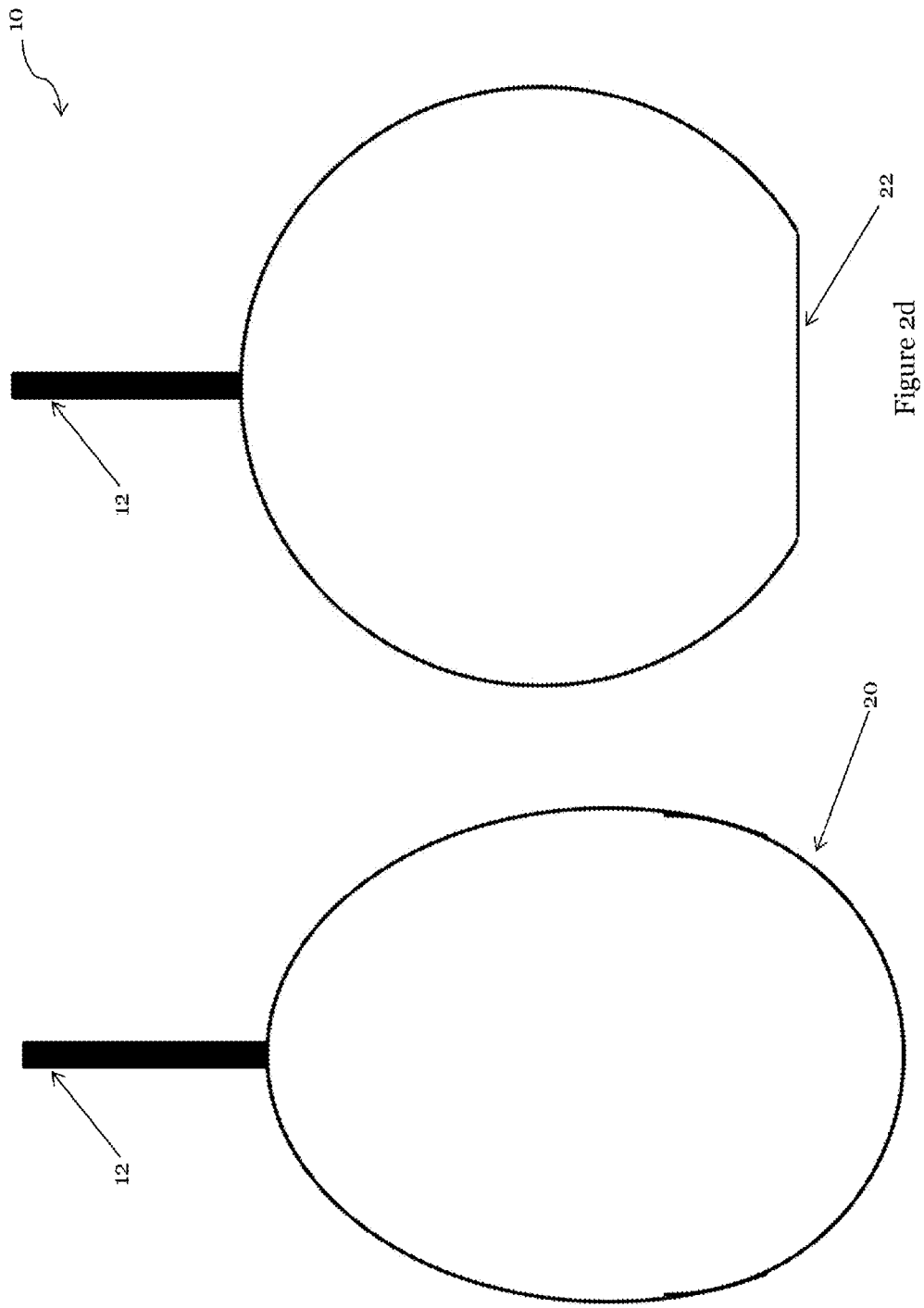

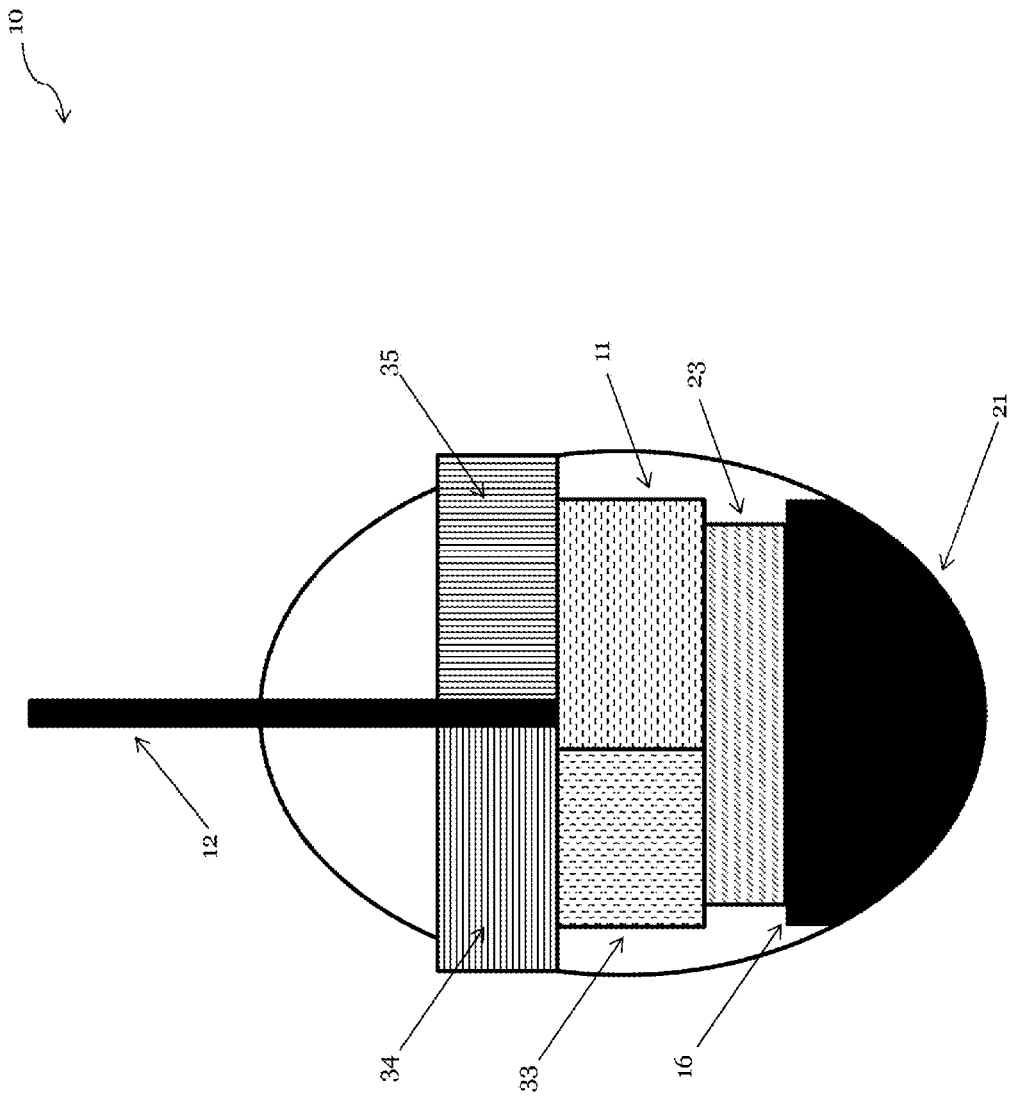

REPEATER DEVICES AND METHODS OF USE

CROSS-REFERENCE TO RELATED APPLICATION

This application claims the benefit of U.S. Provisional App. No. 61/860,242, filed 30 Jul. 2013, which is incorporated by reference herein in its entirety.

TECHNICAL FIELD

This disclosure relates to robotics and to systems and methods for extending the range of a wireless robot.

BACKGROUND

There are a number of challenges in operating wireless robots in environments having no pre-existing wireless signals, weak wireless signals, poor availability of wireless transmission channels, physical barriers causing signal attenuation (e.g., concrete or metal walls or electronic jamming), and/or one or more sources of wireless interference and attenuation.

Remote controlled robots can suffer from reduced range when operating in a large field with line of sight communication and/or when operating in an environment with obstructions, signal reflections, attenuating factors, and/or geometry that can weaken transmission that, for example, reduce operating range.

Thus, there is a need in the robotics field to create a new system and method for extending the range of wireless robots. This invention provides such new systems and methods.

BRIEF DESCRIPTION OF THE FIGURES

FIGS. 2A-D illustrate embodiments of a repeater device having an orienting base.

FIG. 3 is a cross-sectional view of one embodiment of a repeater device having an orienting base.

FIG. 7b is a cutaway view of the repeater device dispenser of FIG. 7a.

DETAILED DESCRIPTION

To increase the range of a remote controlled robot, one or more repeater devices can be used. A repeater device can include a transceiver, which includes both a receiver and a transmitter. A repeater device can include one or more antennas and can be powered by a battery or any other suitable power supply. For example, a repeater device can be a wireless access point, a wireless repeater, a wireless router, a Bluetooth device, and/or any other suitable device that can receive and rebroadcast a wireless signal. Repeater devices can include hard line transceivers and connecting cables in addition to or instead of wireless transceivers. Hard line connections between one or more repeater devices can include copper wire, telephone wire, twisted pairs, category 5 cable, category 6 cable, optical fiber, coaxial cable, or any other suitable communications cable.

A robot can be equipped with a transceiver and one or more antennas and can also function as a repeater device.

Figure 1:
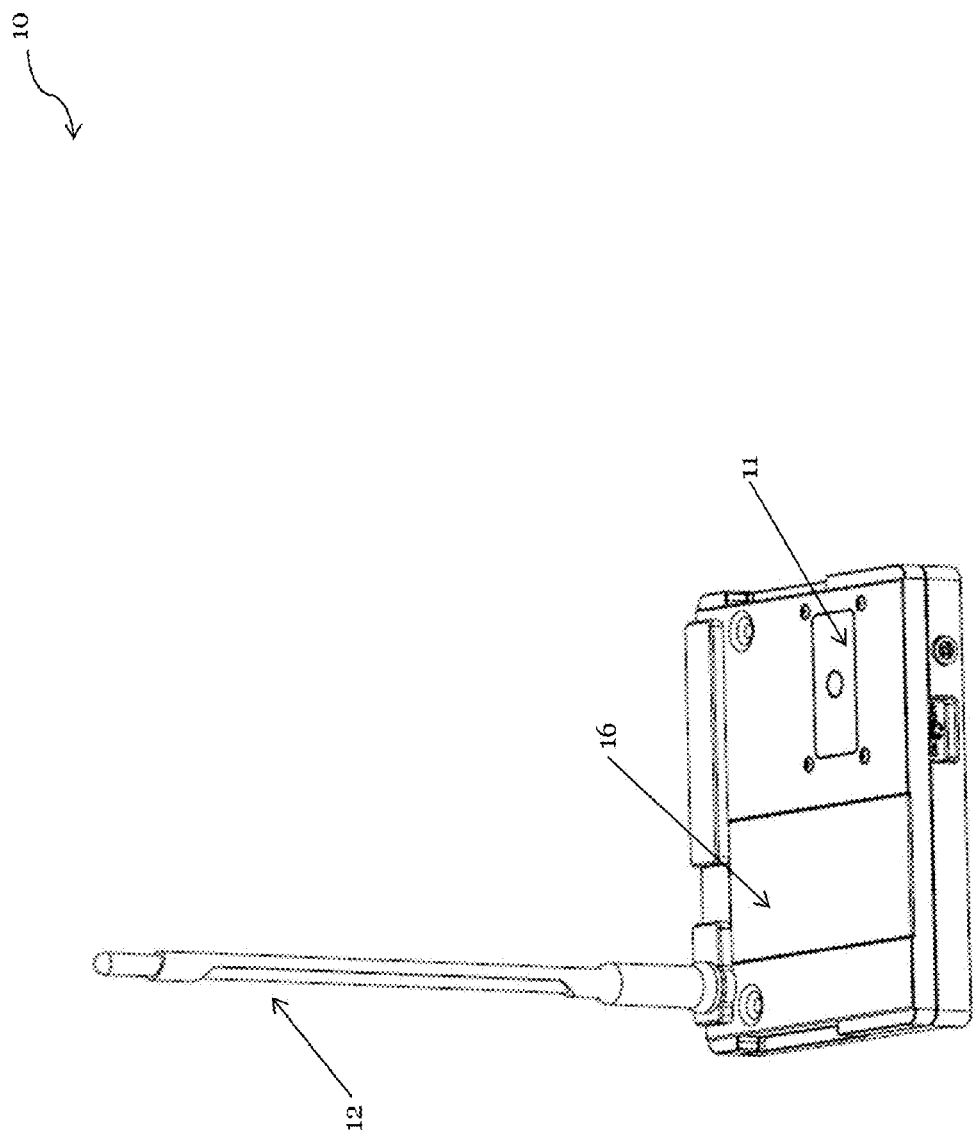
FIG. 1 illustrates one embodiment of a repeater device.

As shown in FIG. 1, a repeater device 10 can include one or more transceivers 11, one or more antennas 12, and one or more power supplies 16. The transceiver 11, antenna 12, and power supply 16 can be in any orientation suitable for signal transmission and/or reception. Any suitable deployment technique can be used for deploying repeater devices. The transceiver 11 can include a receiving antenna, for example, internal, high-gain. The transceiver can include a low-noise amplifier. Antenna 12 can be, for example, external, omnidirectional, high-gain. Antenna 12 can include a power amplifier. Antenna 12 can be any suitable antenna capable of transmitting or receiving wireless signals, for example, an antenna array, a patch antenna, a dipole antenna, a YAGI antenna or combinations thereof. Antenna 12 can be folded for more convenient and/or more compact storage. For example, antenna 12 can be in the fully retracted configuration while stored and in the fully extended configuration while deployed. Antenna 12 can be spring-loaded and/or telescoping to assist in orienting the antenna 12 when unfolded or released.

A robot, a human, an animal, and/or any suitable device can attach an antenna 12 to a repeater device 10 after deployment. The orientation of an antenna 12 can be actuated and/or adjusted using a motor or other suitable actuator device. For example, the orientation of an antenna 12 can be adjusted using a motor controlled with logic including a feedback loop designed to measure signal strength and associate signal strength with antenna orientation, such that the antenna 12 is oriented (possibly readjusted and/or reoriented continuously) for a specific level of signal strength (of received signals, transmitted signals, or both). Alternatively, a repeater can include a highly directional antenna such as a dish or "cantenna." A power supply 16 can be one or more solar panels/chargers, lithium-ion batteries, nickel metal hydride batteries, alkaline batteries, and/or fuel cells, or can be a power line or a splice into a power line, wall socket, or any other suitable power supply. A power supply 16 can be detachable, rechargeable, and/or interchangeable.

Repeater Devices—Orienting Base

The repeater device can be configured to maintain a stable position. A stable position can be a position that maintains some level of data transmission. The stable position can be a position that prevents the repeater device from substantially moving (e.g., preventing a repeater device from falling on a side) such that a stable coverage area is provided. The stable position can be an orientation of an antenna such that a stable signal is provided (e.g., preventing the repeater device from exhibiting reduced transmission capabilities due to a sub optimal antenna orientation). The stable position can be a combination of the position and the orientation of the antenna. For example, the repeater device can have a shape, orienting base, and/or weight that assist the repeater device to achieving the stable position.

As shown in FIGS. 2a, 2b, and 2c, the repeater device can include an orienting base. The orienting base can function to orient a repeater device for transmission. The orienting base can be weighted and/or shaped. The shaped and/or weighted orienting base can assist to right the repeater device if disturbed and/or maintain antenna directivity for optimal transmission or desired transmission, such as for the best chance of transmission to a location where a wireless signal may be needed in the future (e.g., oriented to provide signal further up a large hillside, on top of a building, and/or in a basement). Signal coverage can be provided with a high degree of probability for example, by using predictive algorithms, conservative estimates, and/or human judgment. Predictive signal coverage can be determined by a human user with experience, a computer program that can utilize a feedback loop for signal measurement, or an algorithm that deploys a number of repeaters over an area to provide a statistically high probability of signal coverage. This predictive signal coverage can be used in areas where at least one robot is likely to travel and/or where signal propagation is likely to be difficult (e.g. as predicted by a computer algorithm or previous operational experience of the robot and/or human operator).

The repeater device 10 can include an external transmitting antenna 12 and can have an orienting base 20, 21. For example, as shown in FIG. 2a, the repeater device 10 can have a spherical shape and a spherical base 20. As shown in FIG. 2b, the repeater device 10 can have an ovoid shape and an ovoid base 21. As shown in FIG. 2c, the repeater device can have an ovoid shape and a spherical base 20.

The repeater device can have a spherical shape and a flat surface such that the repeater device can roll until it reaches the flat surface. For example, as shown in FIG. 2d, the repeater device 10 can have a spherical shape with a flat surface 22 and can have an antenna 12 positioned such that when the repeater device 10 is in a stable position, the antenna 12 will have a desired orientation to allow for desired transmission to a location where a wireless signal is desired, for example, a location where the wireless signal may be desired in the future.

As shown in FIG. 3, the power supply 16 can be located in the orienting base of a repeater device 10 such that the repeater device 10. The orienting base may include a weight, such that the repeater device may wobble when perturbed and the weight may assists in maintaining the antenna orientation. The weight can include the power supply. The weight can include one or more ballast materials 23. The ballast material 23 can be used in addition to or instead of a power supply 16 to provide a weight for the orienting base of the repeater device 10. The ballast material can provide additional functionality, such as a water supply, an ink, or dye (e.g., an orange or ultraviolet dye). The ink or dye can be configured to leak from the repeater device if the repeater device is tampered with such that the person(s), animal(s), and/or device(s) that tampered with the repeater device is marked by the ink or dye. The ink or dye can be configured to leave a trail as it leaks from the repeater device.

As shown in FIG. 3, the repeater device 10 can include one or more sensors, data storage devices, emitters, GPS receivers, microphones, speakers, video cameras, and/or any other suitable devices or sensors. For example, the repeater device 10 can include a GPS receiver, a microphone, and/or a wireless video camera. The repeater device 10 can include a motor. The motor can be used to adjust the orientation of an antenna; for example the motor can be used to adjust the orientation of the antenna according to signal strength and/or desired directivity, and/or to preserve battery life.

Repeater Devices—Orienting Shape

Figure 4A:
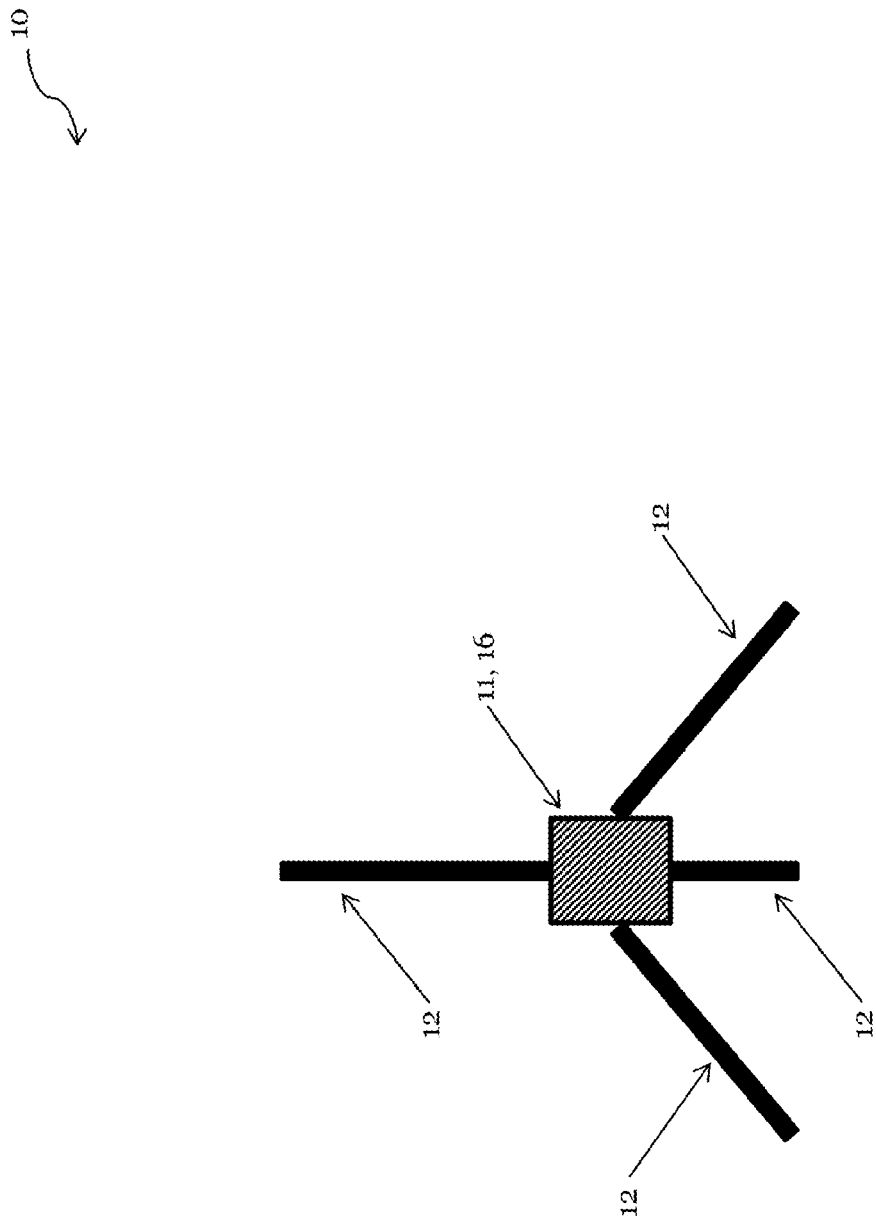
FIG. 4A-B illustrate embodiments of a repeater device.
Figure 4B:
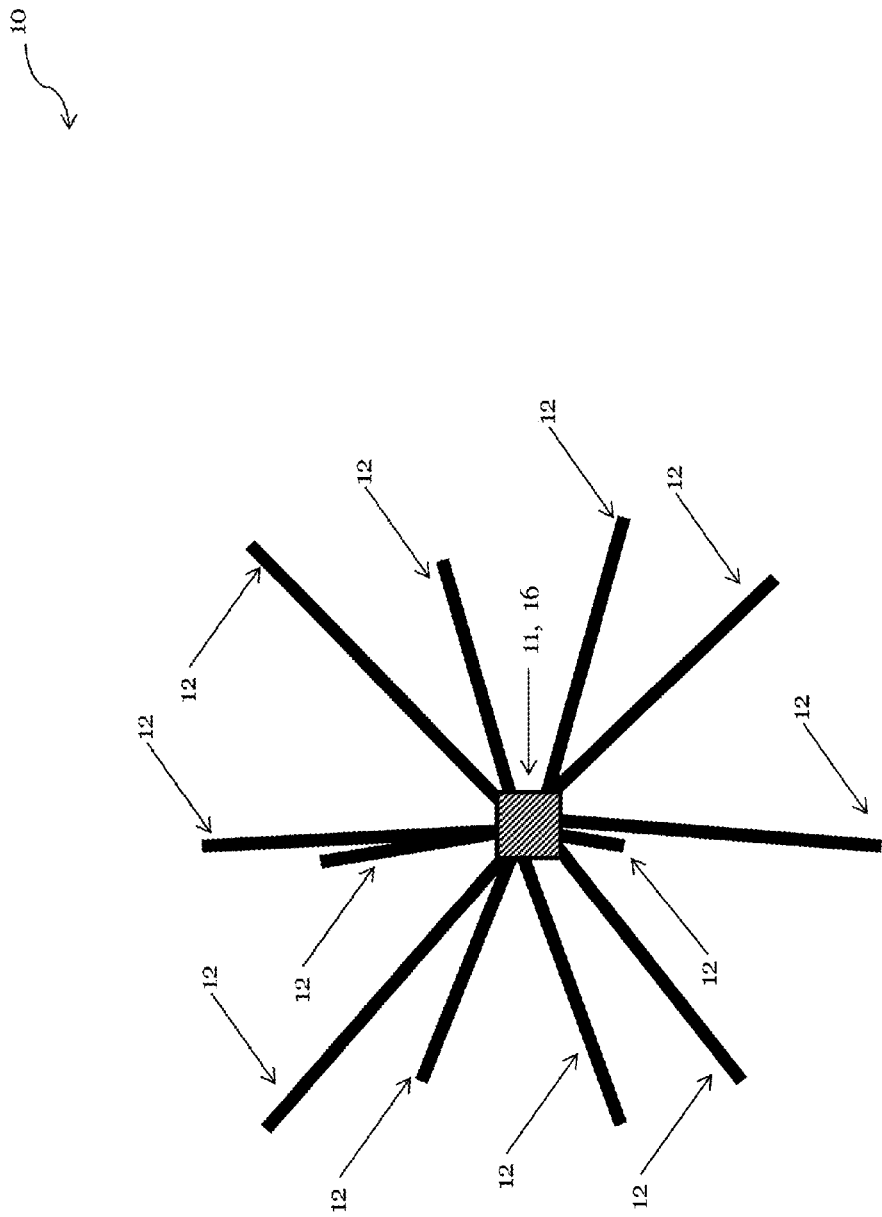

The repeater device can include four or more antennas arranged such that the repeater device can orient itself like a caltrop, such that at least one of the antennas will always point upward from a stable base. For example, as shown in FIG. 4a, the repeater device 10 includes four antennas 12 arranged such that any three of the antennas can function as a stable base while the remaining antenna points up and allows transmission. As shown in FIG. 4b, the repeater device 10 includes twelve antennas 12 arranged such that any four of the antennas can function as a stable base while at least one of the remaining antennas points up and allows transmission.

Figure 5B:
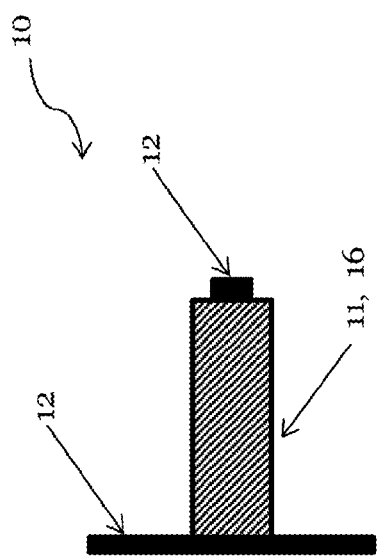
FIGS. 5A-B illustrate front and side views of one embodiment of a repeater device.
Figure 5A:
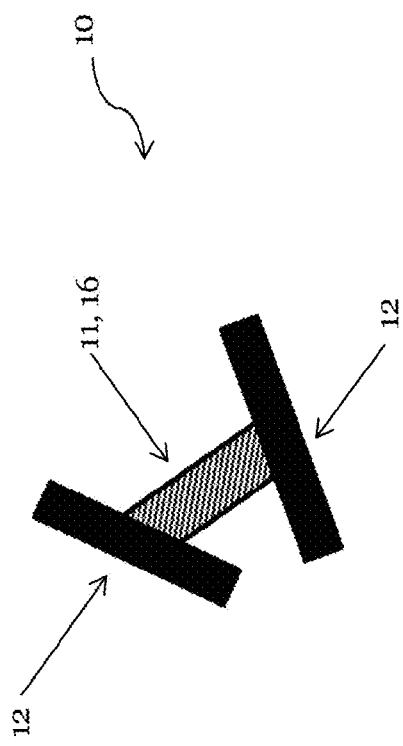

The repeater device can include two or more antennas arranged in the shape of a dolos, such that the antennas are orthogonal to each other. For example, as shown in FIGS. 5a and 5b, the repeater device 10 includes two antennas 12 arranged such that at least one of the antennas will have a desirable orientation when the device 10 is in a stable position.

Repeater Devices—Methods of Use

Repeater devices can be placed in a pre-determined location or pattern of locations; positioned as desired to propagate a wireless signal; distributed uniformly along a path or over an area; and/or scattered along a path or over an area. The repeater device can be fixed to a desired location. For example the repeater device can be attached to a building and/or an animal. The repeater device can be fixed to the desired location directly or indirectly. For example, the repeater device can be indirectly attached to an animal via a dog collar and/or cowbell.

The repeater device can be retrieved and redeployed. The repeater device can be disposable. The repeater device can be installed in buildings as a fixed infrastructure; for example, along a regular robot patrol route. The repeater device can be plugged into wall sockets and/or wired directly into the power grid of a building and can be used to improve wireless signal strength throughout the building.

Figure 6C:
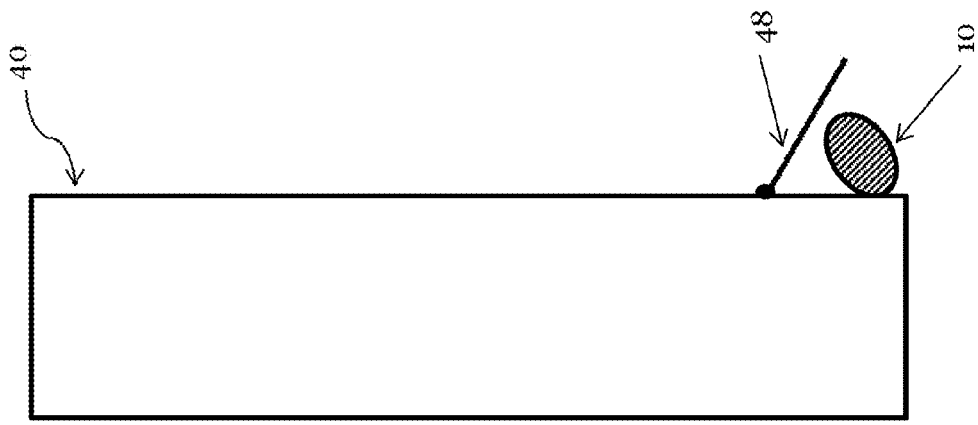
FIGS. 6A-C illustrate front and side views of one embodiment of a repeater device dispenser.
Figure 6B:
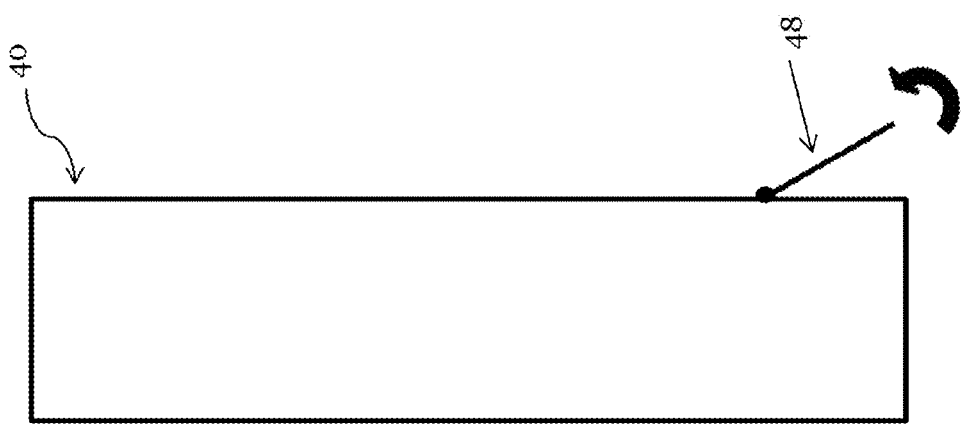
Figure 6A:
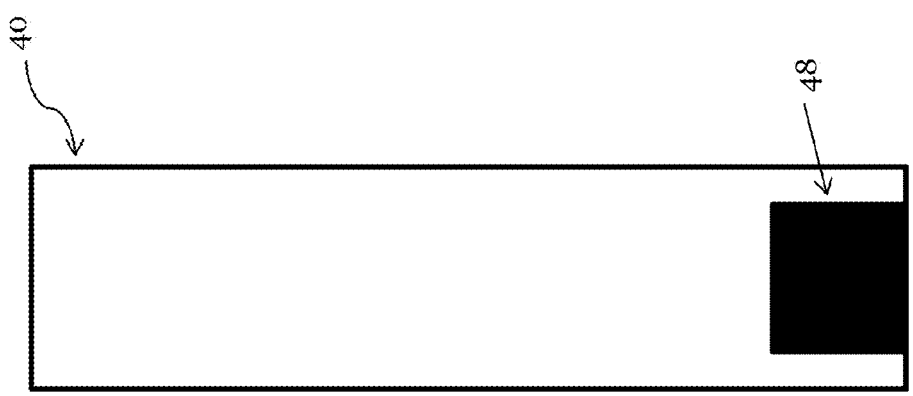

The repeater device can be dispensed or deployed via a dispenser. The dispenser can be, for example, a device resembling a forklift, a device resembling a candy dispenser, a device resembling a spring-loaded gun magazine, a screw conveyor, a container with a door or one-way door, a tray, a basket, a cannon or other launcher, and/or any other suitable device for dispensing the repeater devices. As shown in FIGS. 6a, 6b, and 6c, the repeater device can be deployed with a dispenser 40 that includes a door 48.

Figure 7A:
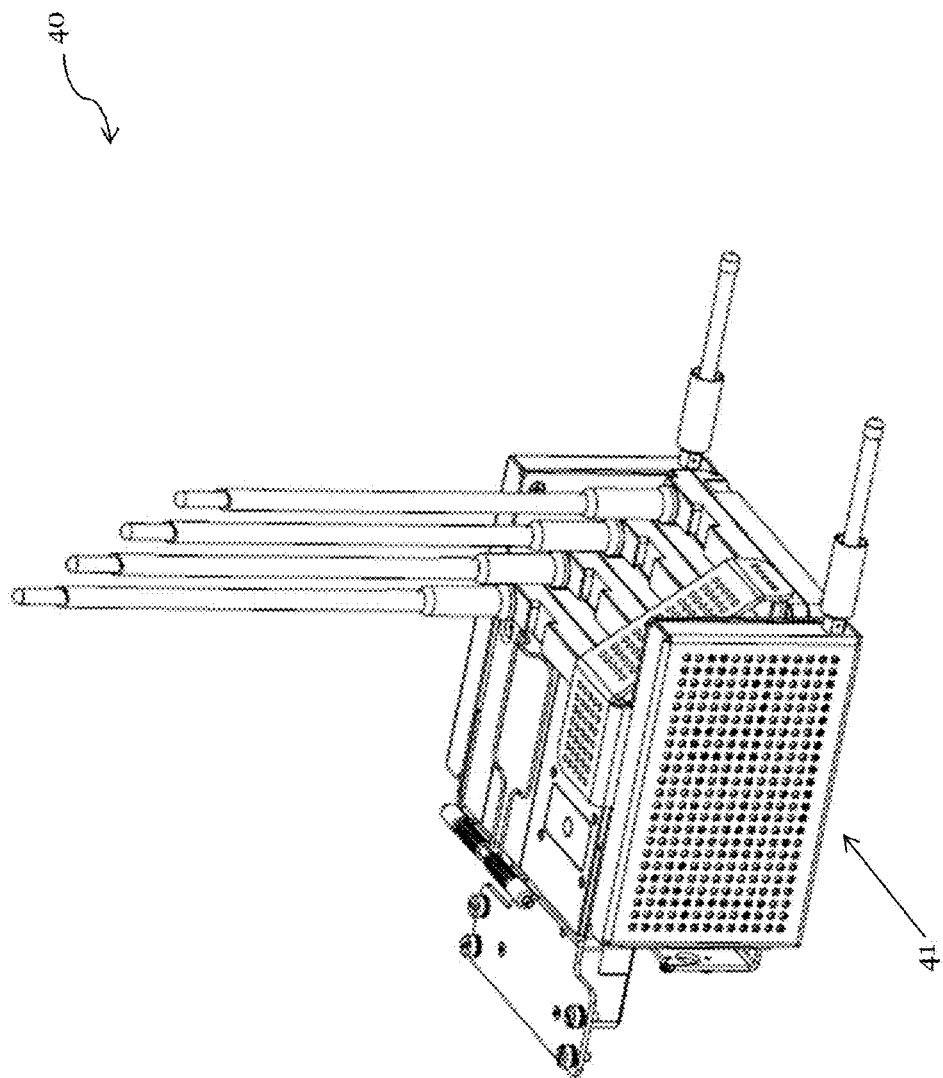
FIG. 7a illustrates one embodiment of a repeater device dispenser.
Figure 7B:
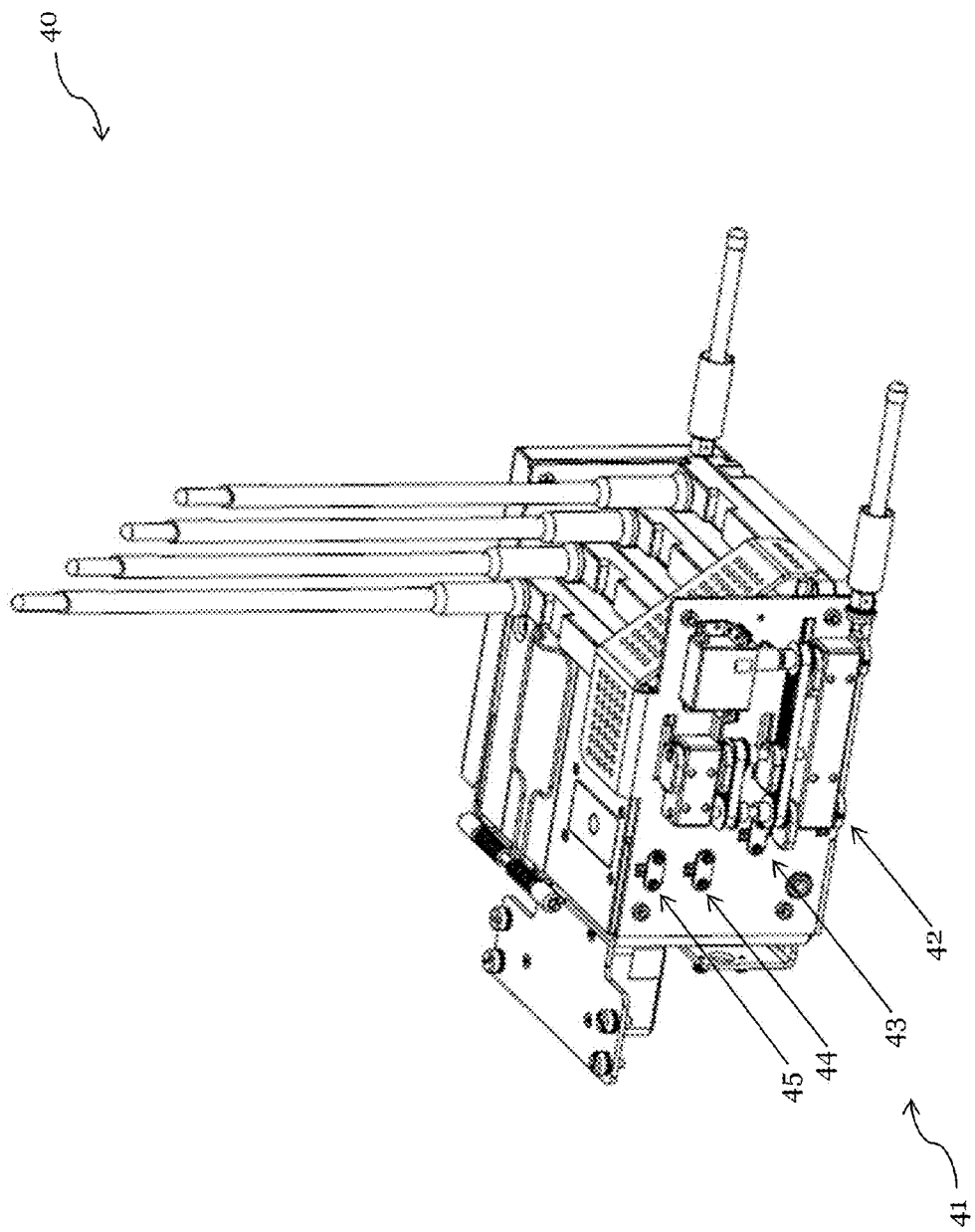

As shown in FIG. 7a, the dispenser 40 can include a holding mechanism 41 configured to hold, deploy, stabilize, reload, and/or load one or more repeater devices 10. The holding mechanism 41 can be an elastic cord, a spring mechanism, a friction- or pressure-based gripping device, a latching mechanism, and/or any other mechanism suitable for holding the repeater device. For example, as shown in FIG. 7b, the holding mechanism 41 can hold one or more repeater devices 10 in place by keeping latches 42, 43, 44, 45 closed. The holding mechanism 41 can deploy the repeater device 10 by opening latch 42 while keeping latches 43, 44, 45 closed to hold additional repeater devices 10 in place. The holding mechanism can then deploy another repeater device 10 by opening latch 43 while keeping latches 44, 45 closed. The latches or other holding mechanisms can be actuated individually and/or actuated with the same actuator such that each actuation results in the deployment of a different repeater device 10. For example, a rotating spindle with attached prongs or keys can have the prongs or keys arranged 5-60 rotational degrees apart, such that rotating the spindle the appropriate number of degrees would remove a prong or key from a cavity or keyhole in the chassis of a repeater device 10 and mechanically release the repeater device 10 for deployment and/or drop the repeater device 10. The holding mechanism 41 can also be configured to load one or more repeater devices 10 by opening latches 43, 44, 45 while keeping latch 42 closed.

The dispenser can be operated by a human and/or robot; can dispense one or more repeater devices simultaneously and/or in succession; can be mounted on a vehicle, helicopter, airplane, or any other suitable mode of transportation; and/or can be used to retrieve repeater devices.

Figure 7C:
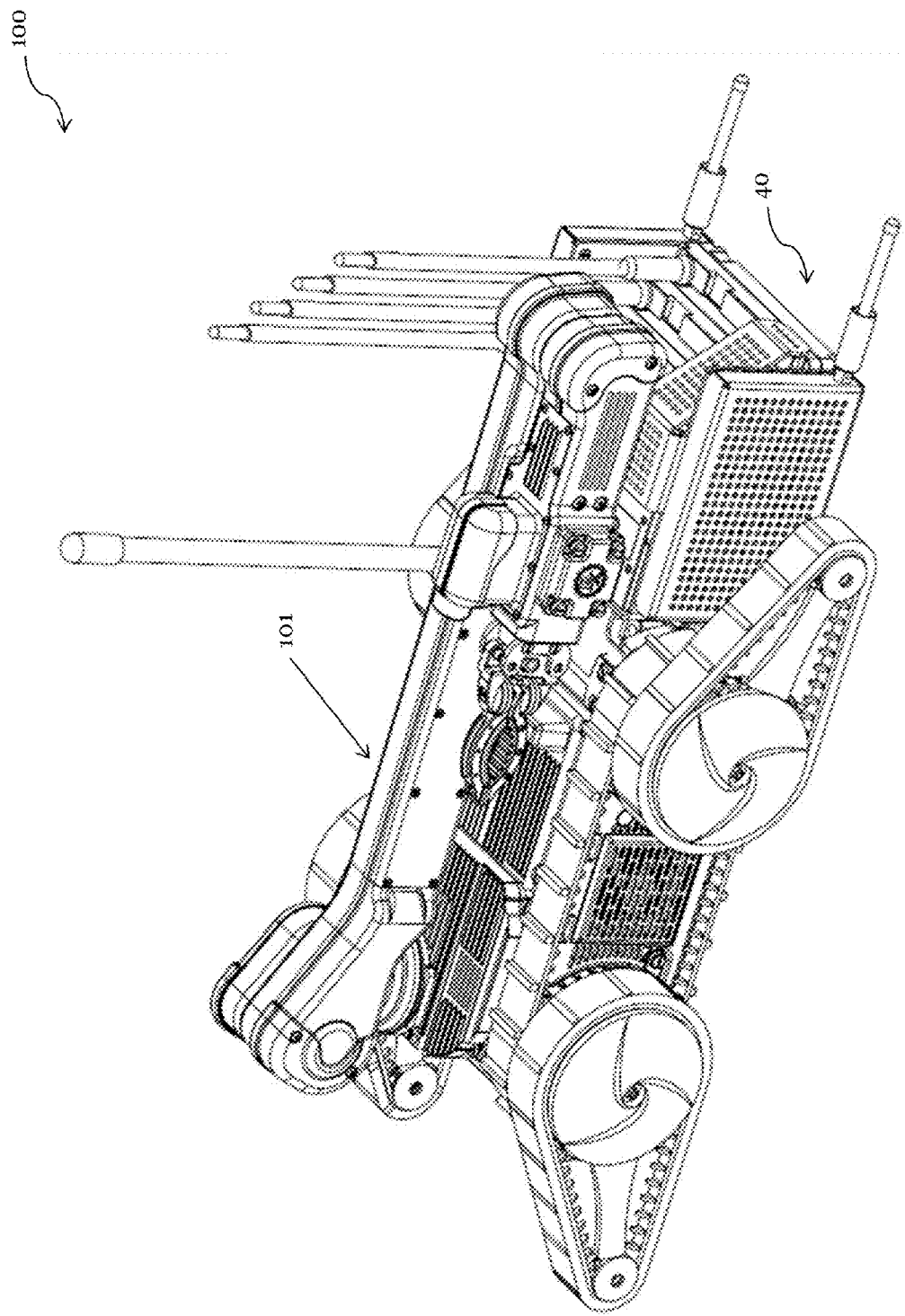
FIG. 7c illustrates one embodiment of a robot having a repeater device dispenser.

As shown in FIG. 7c, the dispenser 40 can be mounted on a robot 100. The robot can provide additional support and/or counterbalancing weight to assist the robot with balancing, e.g. when the robot is equipped with an arm 101.

The dispenser can include sensors capable of counting and/or detecting how many repeater devices it is holding and/or which repeater device will be dispensed next. The information can be used to conserve power; for example, by turning on only the repeater device(s) that is about to be dispensed. The information can be used to calculate a distance the robot has travelled. The information can be used to alert a user when a number of repeater devices in the dispenser crosses below a defined threshold.

Figure 11:
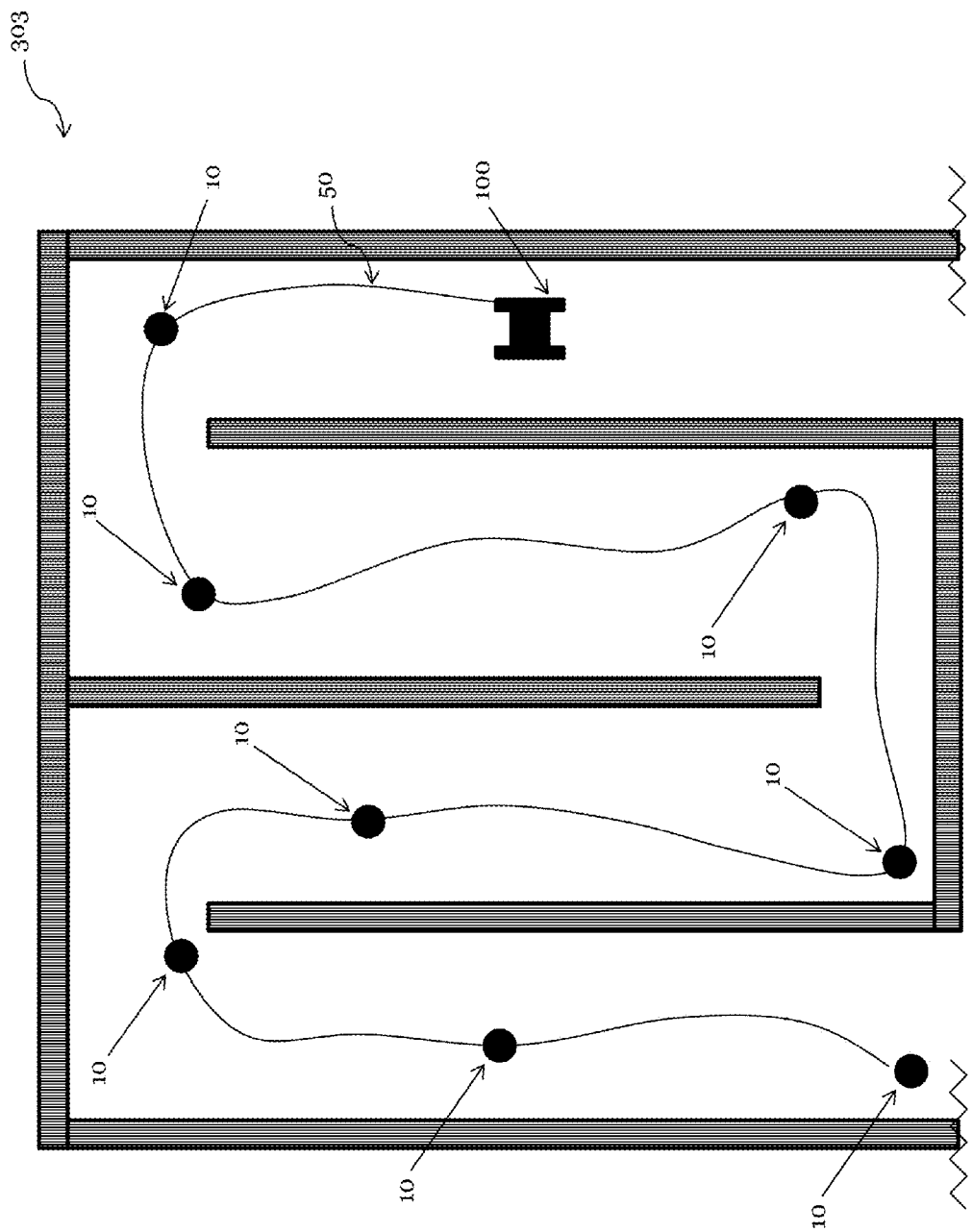
FIG. 11 illustrates an example method for using repeater devices wired in series.

The repeater device can have a variable power output that can be adjusted to improve rebroadcasted signal strength and/or to conserve repeater device and/or robot battery power. For example, repeater devices can be deployed at different distances with different power outputs to improve signal strength and/or to conserve repeater device battery power. As shown in FIG. 11, some of the repeaters 10 can be deployed at uniform or non-uniform distances. The repeaters can conserve power by transmitting at weaker signal strength, and an optimal signal strength can be determined by transmitting at a high signal strength and lowering the signal strength to create a feedback loop (e.g., either continuously or stepwise reductions in transmission power levels) until the transmission fails to be received by another repeater (which can be, for example, any other repeater, the closest repeater, or a specific repeater, depending on the implementation), at which point the power transmission level can be adjusted to be above the transmission power level associated with a transmission failure. A second repeater device can be deployed when a measured signal from a first repeater device crosses below a defined threshold. The distance between consecutive repeater devices can vary depending on the environment (e.g. if there are attenuating barriers between consecutive repeater devices). As another example, when one or more repeater devices are on a robot, the robot can transmit at lower power and allow the repeater devices to boost the signal; thereby improving signal strength and/or conserving robot battery power.

The robot can detect local signal strength and adjust a power output of one or more repeater devices according to an algorithm such as orthogonal frequency division multiplexing (OFDM).

Figure 8:
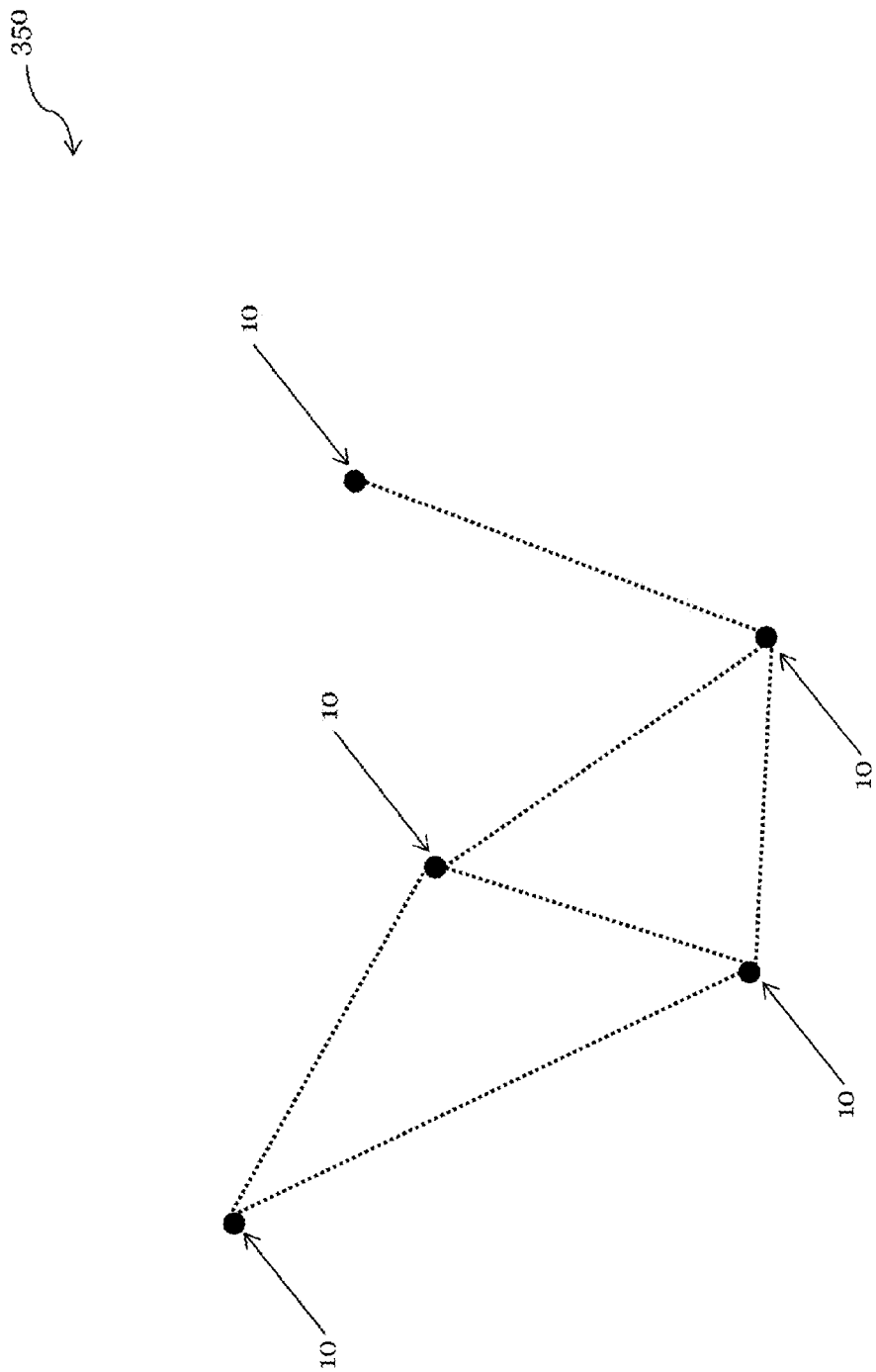
FIG. 8 is a schematic illustrating one embodiment of repeater device communication propagation paths between repeater devices in a wireless network.

The repeater devices can be used as a ring network, a linear network, a star topology network, a wireless mesh network, and/or any combination thereof. For example, as shown in FIG. 8, two or more repeater devices 10 can be used as a mesh network 350 such that some or all of the repeater devices 10 are connected to more than one other node in the network. Two or more repeater devices can be used as a semi-wireless mesh network such that some or all of the repeater devices are hard wired to more than one other node in the network.

Figure 9:
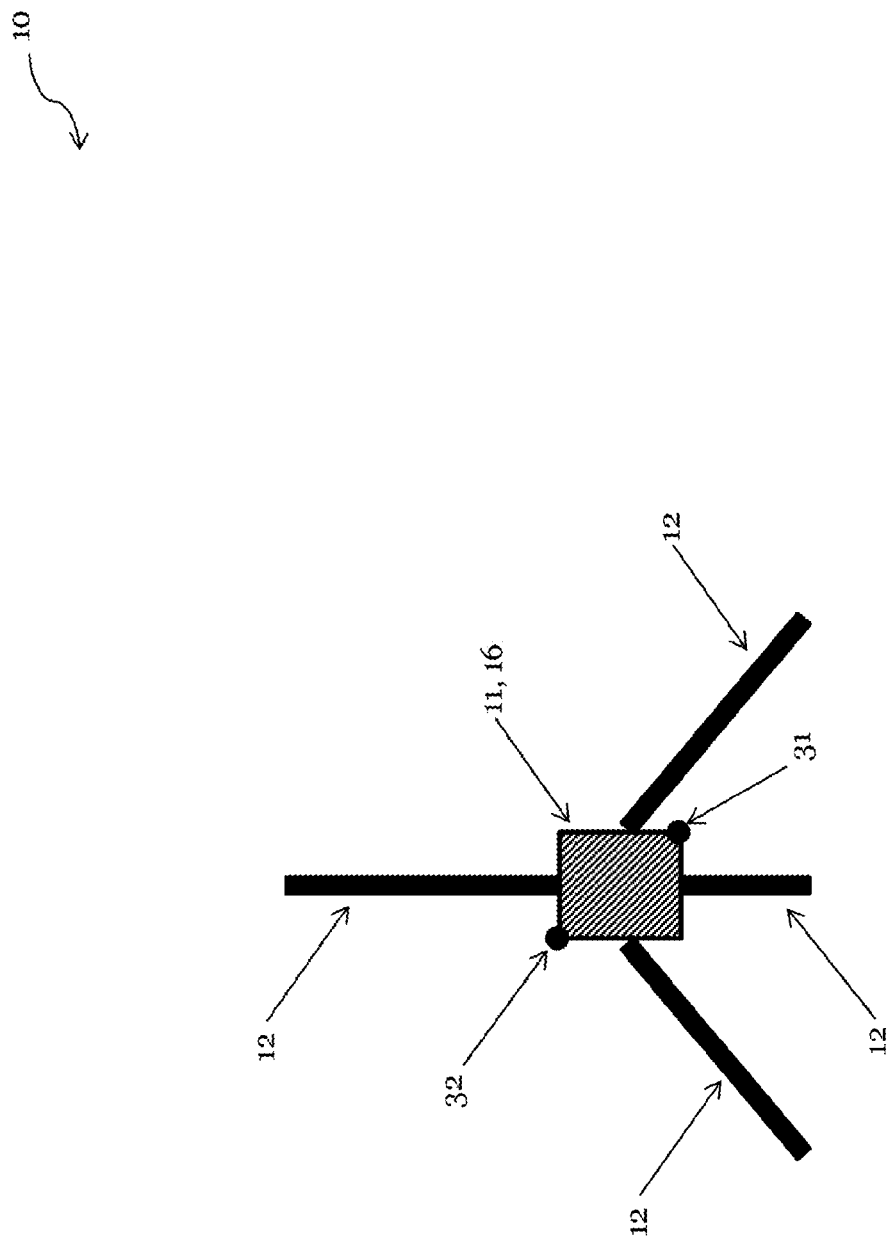
FIG. 9 illustrate one embodiment of a repeater device having a thermometer.

The robot can employ one or more repeater devices to gather information about its environment. The repeater device can include one or more infrared (IR) LEDs, ultrasonic emitters, and/or any other suitable emitter, and a robot can detect and/or track this emission to collect data, such as position, ambient temperature, barometric pressure, light, sound, motion, and/or particle, gas, smoke, visibility, and/or radiation levels. For example, as shown in FIG. 9, the repeater device 10 can include a thermometer 32 and an IR LED 31. If a temperature reading from the thermometer 32 is within a defined range (e.g., 68° F.-78° F.), the IR LED 31 can turn alternate (on and off) with a first defined frequency (e.g. 1 Hz); if a temperature reading is outside of the defined range (e.g., 85° F.), the IR LED 31 can turn alternate (on and off) with a second defined frequency (e.g., 10 Hz). The robot can be equipped with an IR detector and can use measurements of the frequency of activity from the IR LED in the repeater device to gather temperature information.

The robot can use one or more repeater devices to aid in the navigation of the robot. For example, the robot can measure received signal strength and use the received signal strength data to calculate the robot's position and/or to generate a real-time map of the robot's environment.

Figure 10A:
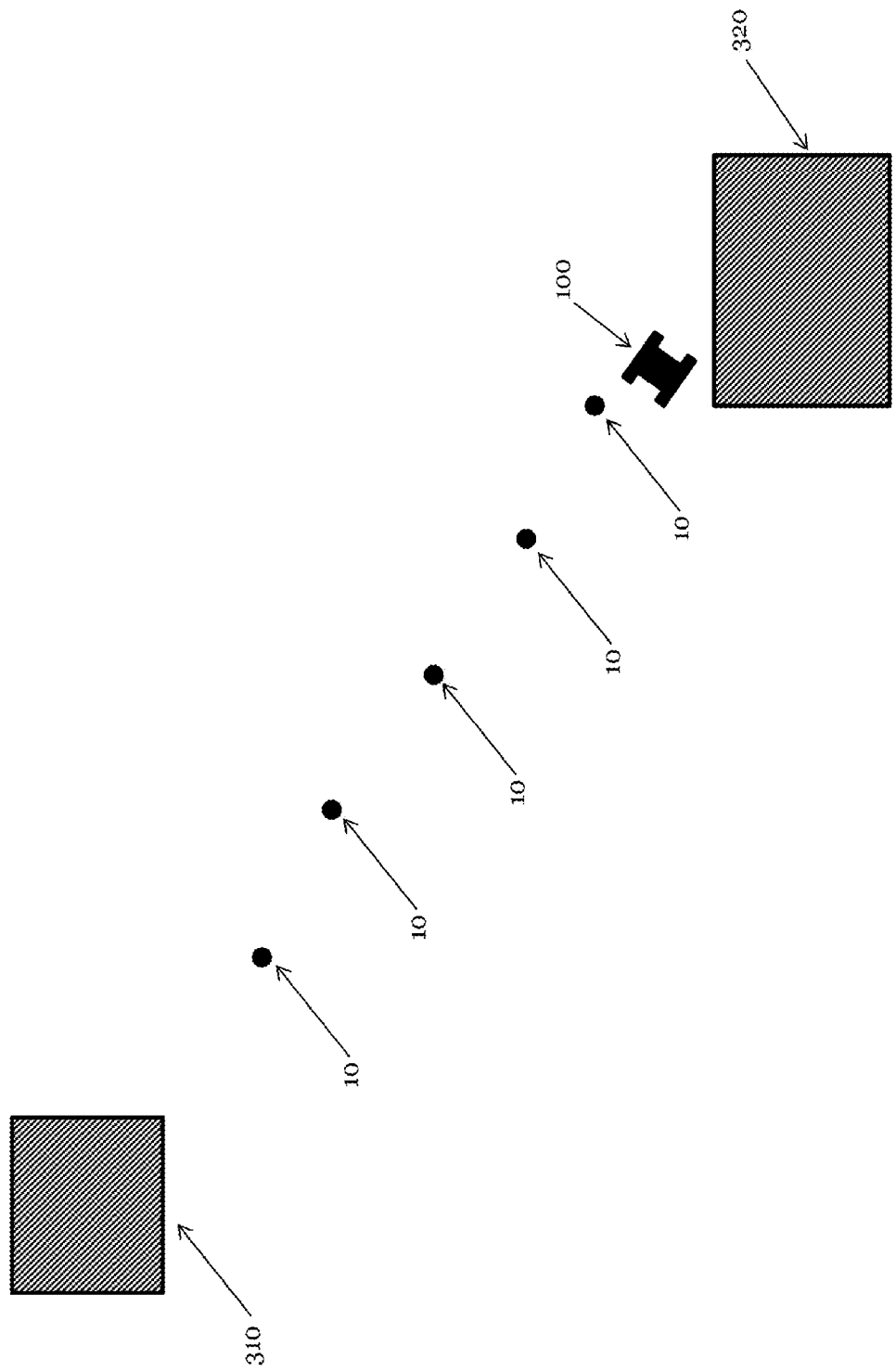
FIGS. 10A-D illustrate example methods for using repeater devices.

The robot is a wireless robot. The robot can use one or more repeater devices to extend the range of the robot's wireless connectivity. For example, as shown in FIG. 10a, in an environment with a weak or no pre-existing wireless network, the robot 100 can distribute one or more repeater devices 10 along the robot's route from a robot command center 310 to a reconnaissance mission target 320.

Figure 10B:
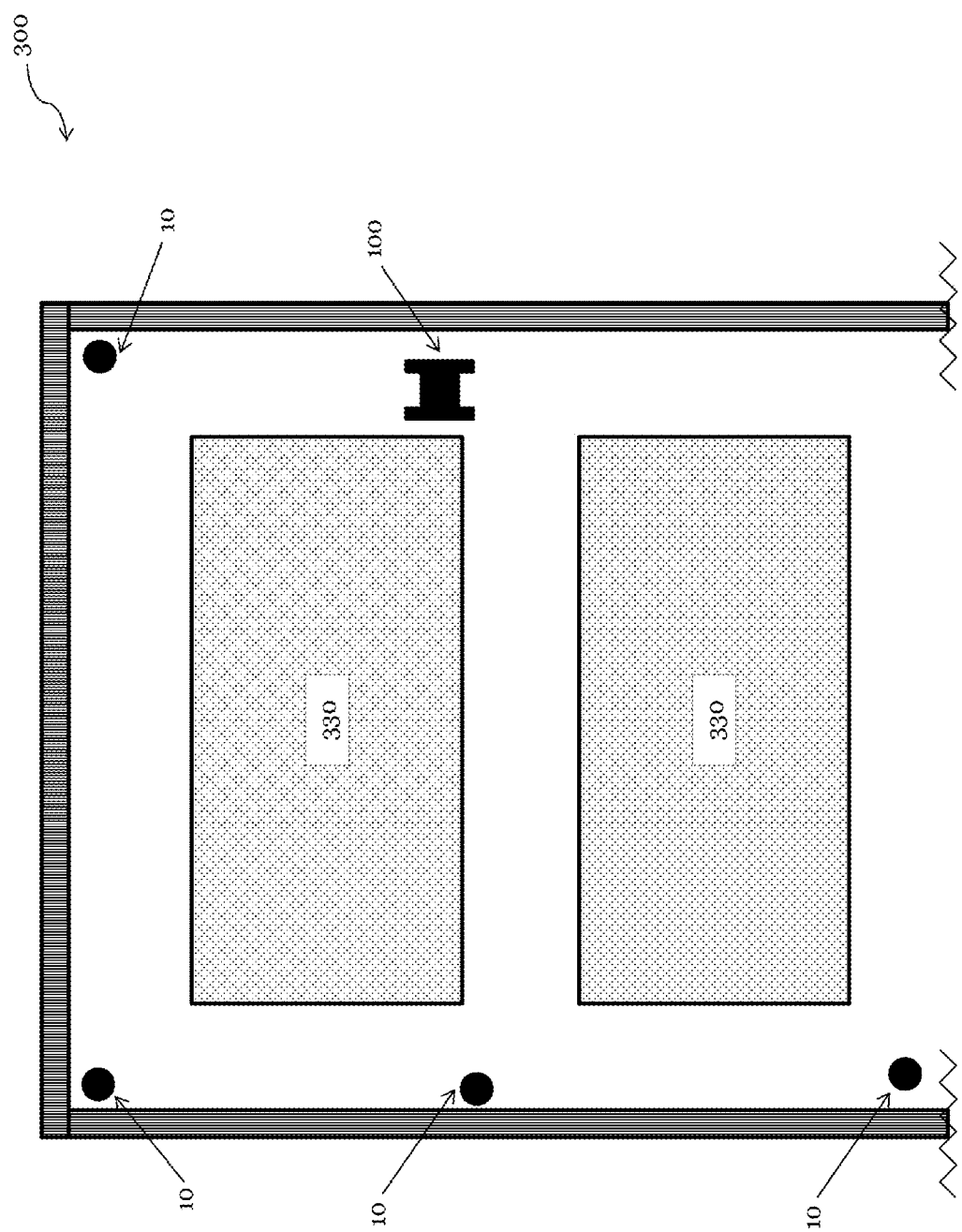

The wireless robot can use one or more repeater devices to improve the performance of the robot's wireless connectivity. For example, as shown in FIG. 10b, the robot 100 can distribute or deploy repeater devices 10 along the robot's security patrol route in a building 300 having at least one source of wireless interference or signal attenuation 330.

Figure 10C:
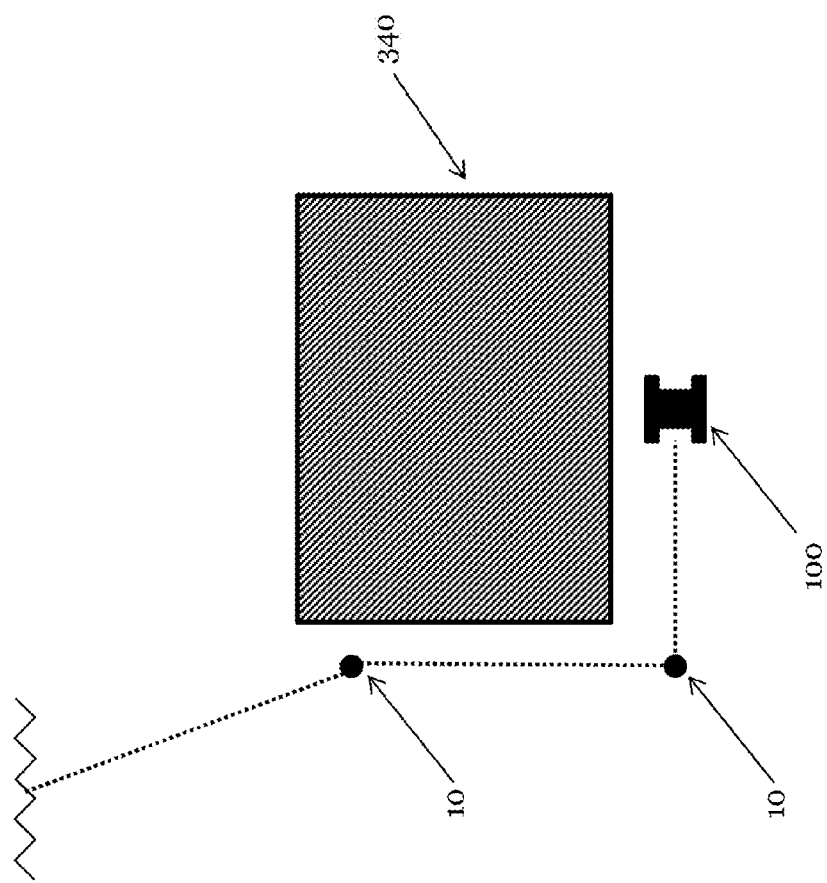
Figure 10D:
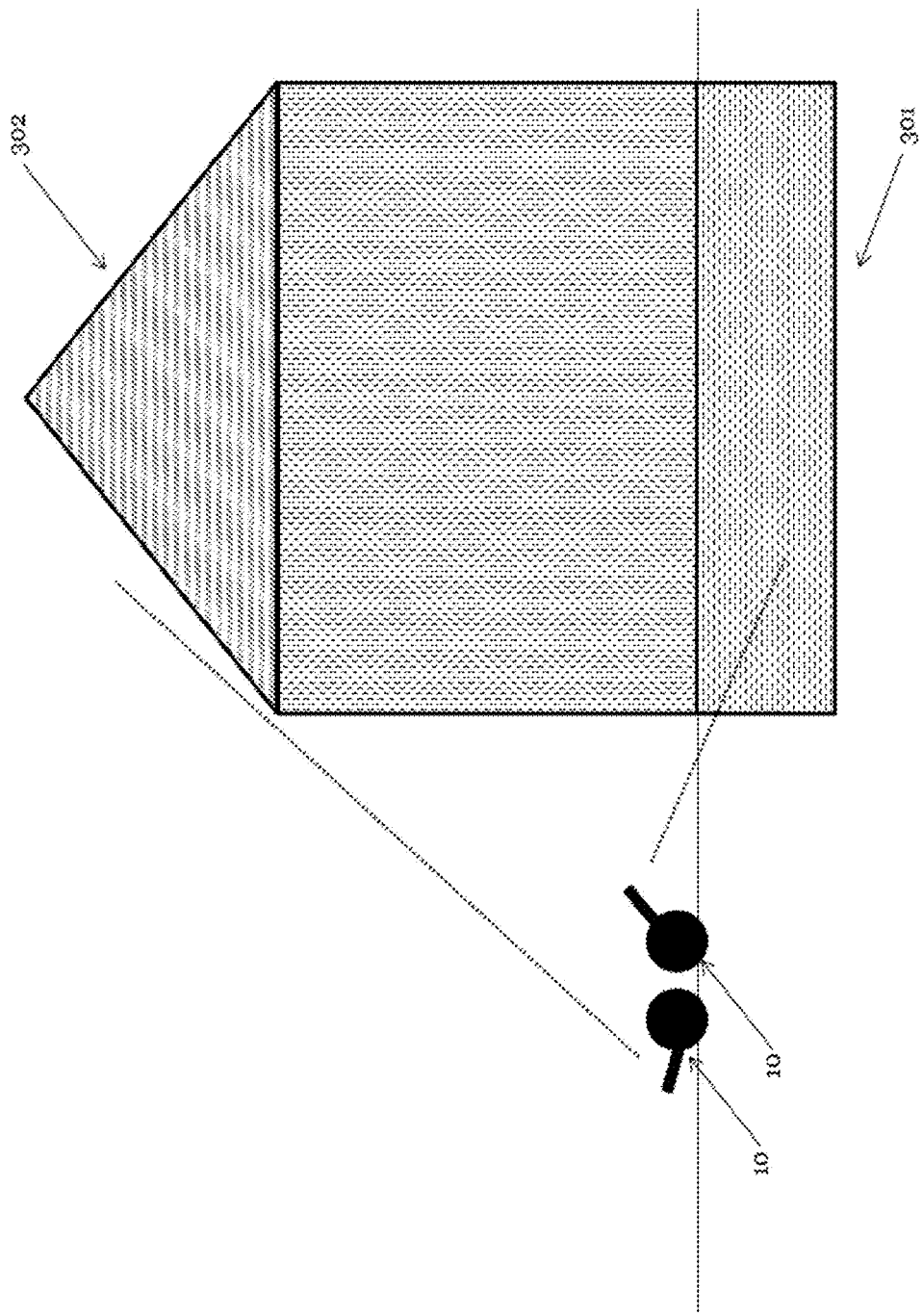

The wireless robot can use one or more repeater devices to maintain wireless connectivity in environments where line-of-sight transmission is likely to be disturbed, or in the presence of other attenuating obstacles (e.g. aluminum shielding, concrete walls, etc.). For example, as shown in FIG. 10c, two or more repeater devices 10 can provide a transmission trail around a large metal object 340, which would attenuate a signal. As shown in FIG. 10d, one or more repeater devices 10 can provide a transmission trail down to a basement 301 and/or up to a roof 302.

The wireless robot can use one or more repeater devices to maintain wireless connectivity in environments where wireless signals do not propagate well, e.g. in tunnels, caves, areas of electromagnetic interference and/or shielding, bomb shelters, fortifications, through metal shielding or metal walls, and structures with thick concrete walls. For example, as shown in FIG. 11, two or more repeater devices 10 can be connected in series with wire 50 to provide a transmission trail through a structure with thick concrete walls 303.

A robotic system can attach a repeater device to a metallic structure in the local environment that can function as an antenna, such as a hand railing, radio tower, truss, railway track, chain-link fence, light pole, signpost, storm drain, vehicle, door frame, coat hanger, and/or any other suitable metallic structure.

A first robotic system and/or second robotic system can be repeater devices. The first and/or second robots can communicate with first and/or second wireless controllers, respectively, such as described by U.S. Pat. No. 8,100,205, issued Jan. 24, 2012; and U.S. patent application Ser. No. 13/740,928, filed Jan. 14, 2013, which are incorporated by reference herein in their entireties. A data storage device, such as a memory drive (e.g., on a USB flash drive), and/or supplemental antenna (e.g., on a USB antenna) can be connected to the processor and/or motherboard of the first controller. The memory drive can have executable software instructions configured to instruct the first robotic system to transmit some or all of the data received from the repeaters by the first robotic system to be transmitted from the first robotic system to the second robotic system. The supplemental antenna can transmit some or all of the data received from the repeaters by the first robotic system to the second robotic system. The data can include some or all of the data traffic and/or some or all of the traffic data regarding location (e.g, including elevation) and/or motion (e.g., orientation, speed, direction of motion, acceleration, direction of acceleration) of the repeater devices (e.g., including repeater devices on or attached to robotic systems and not on or attached to robotic systems) in the network.

As a person skilled in the art will recognize from the previous detailed description and from the figures and claims, combinations, modifications and changes can be made to the elements without departing from the scope of the disclosure.

What is claimed is:

1. A method for creating a network of repeater devices comprising:
   loading a first repeater device and a second repeater device into a dispenser, wherein the dispenser is on a robot;
   moving the robot to a first location;
   releasing the first repeater device from the dispenser at the first location;
   moving the robot to a second location;
   releasing the second repeater device from the dispenser at the second location;
   sending first data wirelessly from the second repeater device to the first repeater device;
   sending the first data from the first repeater device to a base receiver; and
   adjusting the power of a transmission signal of the second repeater device by the dispenser before releasing the second repeater device, wherein the adjusting of the power comprises calculating the distance from the first location to the second location;
   wherein releasing the first repeater device comprises self-orienting by the first repeater device so a first antenna on the first repeater device extends away from the ground.

2. The method of claim 1, further comprising:
   loading a third repeater device into the dispenser
   moving the robot to a third location;
   releasing the third repeater device from the dispenser at the third location;
   sending a second data wirelessly from the third repeater device to the second repeater device, and from the third repeater device to the first repeater device.

3. The method of claim 1, further comprising sending a second data wirelessly from the second repeater device after the second of the first data, wherein the second of the second data comprises adjusting the signal strength from the second repeater device based on a signal feedback from the sending of the first data.

4. The method of claim 1, wherein the dispenser is attached to the robot.

5. The method of claim 1, wherein the first receiver device further comprises a second antenna, and wherein the first antenna is oriented orthogonally to the second antenna.

6. The method of claim 1, wherein the further comprising adjusting with a motor the orientation of the first antenna.

7. The method of claim 1, wherein the dispenser comprises a holding mechanism.

8. The method of claim 7, wherein the holding mechanism comprises a first latch, and wherein the method further comprises activating the first latch, and wherein the first latch is configured to release the first repeater device from the dispenser when the first latch is activated.

9. The method of claim 8, wherein the holding mechanism further comprises a second latch, and wherein the second latch is configured to release the second repeater device from the dispenser when the second latch is activated.

10. The method of claim 9, further comprising activating the first latch, and activating the second latch after activating the first latch.

11. The method of claim 1, further comprising setting a signal strength of the first repeater device based on a location of release of the first repeater device from the dispenser.

12. The method of claim 1, further comprising detecting with a sensor how many repeater devices are in the dispenser.

13. The method of claim 1, wherein the first receiver device comprises an orienting base attached to the first antenna, wherein the orienting base has a round configuration; a power supply in the orienting base; a ballast weight in the orienting, base; a global navigation satellite system receiver in the orienting base; and a video camera in the orienting base.

14. The method of claim 13, wherein the first receiver device further comprises a second antenna; a third antenna; and a fourth antenna; wherein the antennas are configured so when three of the antennas rest on a plane the remaining antenna is oriented orthogonal to the plane.

15. The method of claim 14, wherein the first, second, third, and fourth antennas are configured in the shape of a caltrop.

16. The method of claim 13, further comprising a liquid dye in the orienting base.

17. The method of claim 1, wherein the first antenna is spring-loaded.

* * * * *